(12) United States Patent
Stelmar Netto et al.

(10) Patent No.: US 11,375,251 B2
(45) Date of Patent: Jun. 28, 2022

(54) AUTOMATICALLY GENERATING ENHANCEMENTS TO AV CONTENT

(71) Applicant: International Business Machines Corporation, Armonk, NY (US)

(72) Inventors: Marco Aurelio Stelmar Netto, Sao Paulo (BR); Bruno Silva, Sao Paulo (BR); Renato Luiz de Freitas Cunha, Sao Paulo (BR); Vagner Figueredo de Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/877,566

(22) Filed: May 19, 2020

(65) Prior Publication Data

US 2021/0368222 A1 Nov. 25, 2021

(51) Int. Cl.
| | |
|---|---|
| *G06F 15/16* | (2006.01) |
| *H04N 21/2343* | (2011.01) |
| *H04N 21/84* | (2011.01) |
| *H04N 21/234* | (2011.01) |
| *H04N 21/4788* | (2011.01) |
| *H04N 21/2668* | (2011.01) |
| *G06N 3/08* | (2006.01) |

(52) U.S. Cl.
CPC ......... *H04N 21/23439* (2013.01); *G06N 3/08* (2013.01); *H04N 21/23424* (2013.01); *H04N 21/2668* (2013.01); *H04N 21/4788* (2013.01); *H04N 21/84* (2013.01)

(58) Field of Classification Search
USPC .................................. 709/231, 204, 205, 234
See application file for complete search history.

(56) References Cited

U.S. PATENT DOCUMENTS

| | | |
|---|---|---|
| 8,340,493 B2 | 12/2012 | Axen et al. |
| 8,713,618 B1 | 4/2014 | Kuznetsov |

(Continued)

FOREIGN PATENT DOCUMENTS

| | | |
|---|---|---|
| WO | 2005048602 A1 | 5/2005 |
| WO | 2013152439 A1 | 10/2013 |

OTHER PUBLICATIONS

Korotkov, "MakeML's Automated Video Annotation Tool for Object Detection on iOS," Heartbeat, Aug. 14, 2019, 9 pages, https://heartbeat.fritz.ai/makemls-automated-video-annotation-tool-for-object-detection-on-ios-889ef7bb525.

(Continued)

*Primary Examiner* — Lan Dai T Truong
(74) *Attorney, Agent, or Firm* — Grant Johnson (57) ABSTRACT

A method for automatically generating enhancements to audio-visual (AV) content, a content manager, and a computer program product. One embodiment may comprise, by a processing unit, analyzing data about consumer interactions to generate consumer insights about the original AV content, automatically associating the consumer insights with a segment of original AV content, automatically generating content for the segment responsive to the consumer insights, and injecting the generated content into the original AV content to create modified AV content. The embodiment may further comprise, by a network interface, receiving data about consumer interactions with original AV content and automatically transmitting the modified AV content.

25 Claims, 6 Drawing Sheets

(56) References Cited

U.S. PATENT DOCUMENTS

| | | | |
|---|---|---|---|
| 9,497,496 | B1 | 11/2016 | Corley et al. |
| 9,524,751 | B2 | 12/2016 | Oz et al. |
| 9,554,093 | B2 | 1/2017 | Hua et al. |
| 9,794,642 | B2 | 10/2017 | Dunker et al. |
| 10,104,403 | B1 | 10/2018 | Ekambaram et al. |
| 10,109,092 | B1* | 10/2018 | Hitchings, Jr. .......... G06T 11/60 |
| 10,346,449 | B2 | 7/2019 | Senftleber et al. |
| 10,366,168 | B2 | 7/2019 | Wu |
| 10,572,679 | B2 | 2/2020 | Frank et al. |
| 2005/0166224 | A1 | 7/2005 | Ficco |
| 2009/0193457 | A1* | 7/2009 | Conn ................... H04N 21/812 725/34 |
| 2012/0096088 | A1* | 4/2012 | Fahmy ................... G06Q 30/02 709/204 |
| 2013/0232203 | A1* | 9/2013 | Moeinifar ........... H04L 65/4046 709/205 |
| 2014/0067517 | A1 | 3/2014 | Volpe |
| 2015/0229977 | A1* | 8/2015 | Kanigsberg ........ H04N 21/2668 725/10 |
| 2018/0034879 | A1 | 2/2018 | Chegini |
| 2018/0132007 | A1 | 5/2018 | Chou et al. |
| 2019/0205726 | A1 | 7/2019 | Khabiri |
| 2019/0320216 | A1* | 10/2019 | Liu .................. H04N 21/44218 |
| 2019/0356669 | A1 | 11/2019 | Karlberg |
| 2020/0137354 | A1* | 4/2020 | Nathan ..................... G06N 3/08 |
| 2020/0195882 | A1* | 6/2020 | Yi ............................. G06F 3/14 |
| 2020/0321007 | A1* | 10/2020 | Stoker ..................... G10L 15/26 |
| 2020/0387341 | A1* | 12/2020 | Robinson ............... G16H 20/30 |

OTHER PUBLICATIONS

Wan et al., "Automatic Sports Highlights Extraction with Content Augmentation," ResearchGate, Nov. 2004, 9 pages, DOI: 10.1007/978-3-540-30542-2_3—Source: DBLP.

Lavrenko et al, "Statistical Models for Automatic Video Annotation and Retrieval," Printed May 11, 2020, 4 pages.

Bianco et al., "An interactive tool for manual, semi-automatic and automatic video annotation," ScienceDirect, Elsevier, vol. 131, Feb. 2015, pp. 88-99, Abstract Only, https://doi.org/10.1016/j.cviu.2014.06.015.

"Automated Video Creation Using Audio and Video Components Extracted From Videos Based on a Received Script for the Video," IP.Com, An IP.com Prior Art Database Technical Disclosure, IP.com No. IPCOM000236565D, IP.com Electronic Publication Date: May 2, 2014, 52 pages.

"Using sentiment analysis to screen online comments," IP.Com, An IP.com Prior Art Database Technical Disclosure, IP.com No. IPCOM000256531D, IP.com Electronic Publication Date: Dec. 6, 2018, 3 pages.

"Cognitive video extraction based on sentiment analysis and user persona," IP.Com, An IP.Com Prior Art Database Technical Disclosure, IP.com No. IPCOM000259030D, IP.com Electronic Publication Date: Jul. 4, 2019, 3 pages.

Tarasowa et al., "CrowdLearn: Crowd-sourcing the Creation of Highly-structured e-Learning Content," Paper, iJEP—vol. 5, Issue 4, 2015, 8 pages, http://dx.doi.org/10.3991/ijep.v5i4.4951.

Poche, "Analyzing User Comments on YouTube Coding Tutorial Videos," Louisiana State University LSU Digital Commons, May 2017, 50 pages.

"Hours of video uploaded to YouTube every minute as of May 2019," Statista, InternebOnline Video & Entertainment, 2020, 1 page, https://www.statista.com/statistics/259477/hours-of-video-uploaded-to-youtube-every-minute/.

Mell et al., "The NIST Definition of Cloud Computing," Recommendations of the National Institute of Standards and Technology, U.S. Department of Commerce, Special Publication 800-145, Sep. 2011, 7 pages.

PCT /IB2021/053404, International Search Report and Written Opinion, dated Aug. 12, 2021, pp. 1-4.

* cited by examiner

AUTOMATICALLY GENERATING ENHANCEMENTS TO AV CONTENT

BACKGROUND

The present disclosure relates to creating and managing audiovisual (AV) content, and more specifically, to automatically enhancing AV content in response to viewer interactions with the AV content.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

A variety of content creators have started to take advantage of these improved capabilities via content streaming and podcasting. Content streaming generally refers to the transmission of audio and/or video files from a server to a client, typically over the Internet, and is widely used to watch video clips and movies on a variety of media players, such as televisions, computers, tablets, and smart-phones. Typically, in content streaming, a viewer/end-user may begin playing the content before the entire file has been transmitted. Podcasting, in contrast, also generally refers to the transmission of audio and/or video files from a server to a client, also typically over the Internet. In podcasting, however, transmission generally occurs before the viewer begins playing the content.

Streaming and podcasting have proven themselves to be excellent platforms for advertisement, reviews of products, troubleshooting problems (e.g., information technology, house maintenance, industry-related issues), and the like.

SUMMARY

According to embodiments of the present disclosure, a method for automatically generating enhancements to audio-visual (AV) content. One embodiment may comprise, by a processing unit, analyzing data about consumer interactions to generate consumer insights about the original AV content, automatically associating the consumer insights with a segment of original AV content, automatically generating content for the segment responsive to the consumer insights, and injecting the generated content into the original AV content to create modified AV content. The embodiment may further comprise, by a network interface, receiving data about consumer interactions with original AV content and automatically transmitting the modified AV content.

According to embodiments of the present disclosure, a content manager. One embodiment may comprise a content creation server communicatively coupled to a plurality of content consumer devices, wherein the server comprises a processor coupled to a memory. The processor and the memory may be configured to receive data about consumer interactions with original audio-visual (AV) content, analyze the data about consumer interactions to generate consumer insights about the original AV content, automatically associate the consumer insights with a segment of the original AV content, automatically generating content for the segment responsive to the consumer insights, inject the generated content into the original AV content to create modified AV content, and automatically transmit the modified AV content.

According to embodiments of the present disclosure, a computer program product for automatically generating enhancements to audio-visual (AV) content. The computer program product in one embodiment may comprise a computer readable storage medium having program instructions embodied therewith, the program instructions executable by a processor. The program instructions may cause the processor to receive data about consumer interactions with original AV content, analyze the data about consumer interactions to generate consumer insights about the original AV content, automatically associate the consumer insights with a segment of the original AV content, automatically generating content for the segment responsive to the consumer insights, inject the generated content into the original AV content to create modified AV content, and automatically transmit the modified AV content.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to creating and managing audiovisual (AV) content; more particular aspects relate to automatically enhancing AV content in response to consumer interactions with AV content, such as comments, viewing behavior, and the like. While the present disclosure is not necessarily limited to such applications, various aspects of the disclosure may be appreciated through a discussion of various examples using this context.

Some embodiments of the present disclosure may provide an automated system to generate new versions of original content, such as video or podcast. This system may include transforming data about consumer interactions with the content, such as crowd comments and viewing/listening behavior (e.g., which part of the video a viewer starts interacting, or which part of the video the user stops interacting), and external data, such as trending search terms, into insights; using the insights to automatically generate content and/or modify content; injecting the generated and/or modified content to create modified version(s) of the content that meet owner constraints and goals (e.g., new video time, external factors that impact video view time, meet highly demanding modification); and minimizing conflicting requests via creation and addition of comments in threads of requested content changes.

In this way, some embodiments may reduce the time and resource required to produce alternate version(s) of AV content tailored for different viewer profiles, to fix errors in the original content, to supplement the original content, to update the original content, and/or to otherwise maintain viewer engagement with the content. In particular, some embodiments may allow for automatic correction of minor but relevant details that may be missing or wrong in the original version of the AV content, and/or for the automatic addition of information responsive to trending topics (e.g., the release of a new version of a smartphone). Correction of these errors and omissions may lead to more views of the AV content and to increased time spent with the AV content, and thus, greater opportunities for branding and investment by their owners.

In an example operation, a content creator/owner may create an original version of a video and then upload that video to a streaming service. The streaming service, in turn, both delivers the video to end users and provides a feedback mechanism, such as a public message board or comment board. When uploading the original video to the streaming service, the content owner may specify that they want and/or will allow automatically generated enhancements to the video. Some content owners may also specify one or more constrains on those enhancements, such as "I want no more than four versions of this video, each under 130% of the original video's duration."

The content delivery service 455 (referring to FIG. 4, which is described in more detail below) may then begin to distribute the original video to end users, who may submit feedback to the streaming service in the form of text comments on the message/comment board. Example user comments may include "Watching it at 1.25× speed makes it perfect," and "It is difficult to see that URL in the browser at 12:54," and "Does this work in the new iPhone just released?" The streaming service may also allow users to react to comments submitted by others, such as indicating they "like" or "dislike" a comment and/or by submitting reaction comments to the original comment (collectively user "reactions"). These reactions may be threaded with their base comment, such that a reaction stating "She is probably using 3.7 because this is what is set in variable PYTHON" will appear in close proximity to a base comment "Which version of Python was this tested on?", no matter when or by whom the two comments were submitted.

Figure 4:
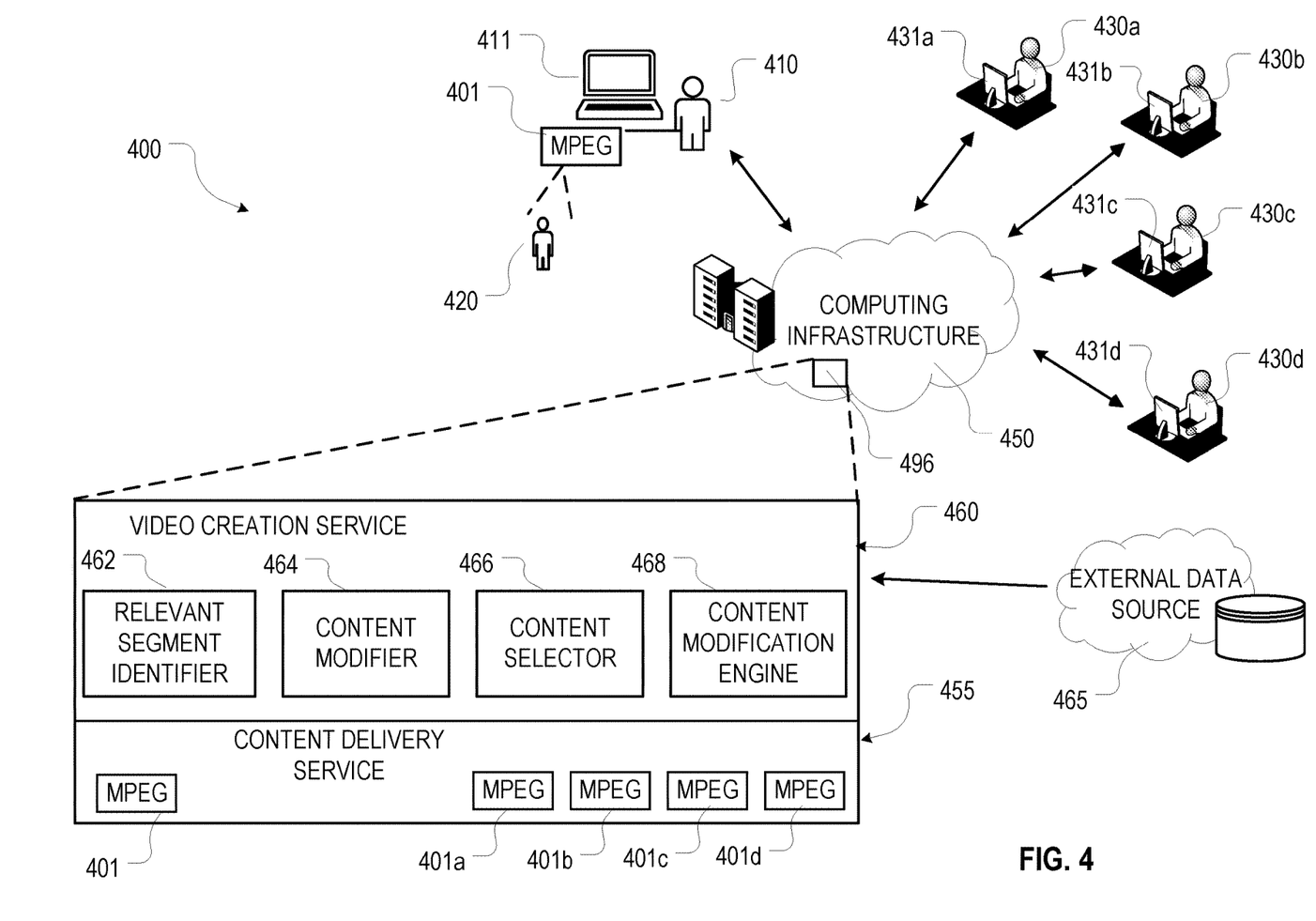
FIG. 4 depicts a system architecture, consistent with some embodiments.

The video creation service 460 may analyze the submitted comments, as well as submitted reactions, to detect problems in and/or areas for improvement of the original video. This may include using natural language processing (NLP) techniques, including sentiment analysis, to analyze and understand the meaning, tone, and direction of the comments and reactions. In some embodiments, this may include resolving conflicts between the submitted comments and reactions, such as prioritizing more recent comments and/or comments by individuals with a higher online reputation. The video creation service 460 may then associate the resulting insights to specific segments of the original video.

This may again include using NLP techniques, such as generating a time-indexed transcript of the original video. It may also include using object identification techniques to classify the content of the original video.

Next, some embodiments may select an optimal fix from a menu of potential operations responsive to one or more of the comments and/or reactions. In some embodiments, this menu of potential operations may include, without limitation, increasing the broadcast speed of a portion of the video (e.g., 1× speed to 1.25× speed), decreasing the broadcast speed of a portion of the video (e.g., 1× speed to 0.8× speed), retrieving and inserting supplemental external material, creating and inserting supplemental original material, and editing portions of the original material. In some embodiments, this may include generating a plurality of candidates for addition, and then selecting from among the candidates using preferences and restrictions provided from the content owner.

In some embodiments, the supplemental material may include overlying textual material to the existing video segment, such as adding a URL at which a particular product can be obtained or more information can be found or with some additional explanatory text. In some embodiments, supplemental material may be included by using Deep Learning and Generative Adversarial Network (GAN) techniques to generate realistic simulations of the voice(s) and/or face(s) of the content presenters/actors in the original video. In this way, for example, if the contents or reactions indicated that the original content contained an error, a new version of the video can be created with the correct facts, and in which it appears as though the content presenters actually voiced the correct facts. Some embodiments may automatically publish the updated version, and some embodiments may require that the owner of the original video approve the changes.

In some embodiments, the video creation service 460 may generate multiple, different versions of the edits and/or supplemental material to produce multiple, different modified versions of the original video, with each modified version targeted at a different viewer profile. Continuing the example above, the video creation service 460 may create a first version of the video targeted at information technology (IT) professionals, in which an overlay is added clarifying that "Python version 3.7" was used, and a second version of the video targeting retail users of a particular brand of smartphone, in which a GAN creates a new video segment announcing compatibility and optimal settings for the latest version of the smartphone.

After publication of the updated video(s) to the content delivery service 455, the video creation service 460 in some embodiments may then perform an A/B testing on different versions (e.g., original vs. modified; new version A vs. new version B, etc.) to determine if there are any additional areas for improvement, as well as to determine which version has higher viewer engagement scores. If the new version has better scores, then the content delivery service 455 may then license the resulting work back to the content owner. In some embodiments, the video creation service 460 may also pay viewers who submitted comments and reactions to the original or amended content that were used to create a new version of the video, as well as external sources for any content used. In still other embodiments, the content delivery service 455 may create a marketplace of video links (cross-reference), in which different versions of the original content can be presented to different users based on viewer profiles.

Cloud Computing

Figure 1:
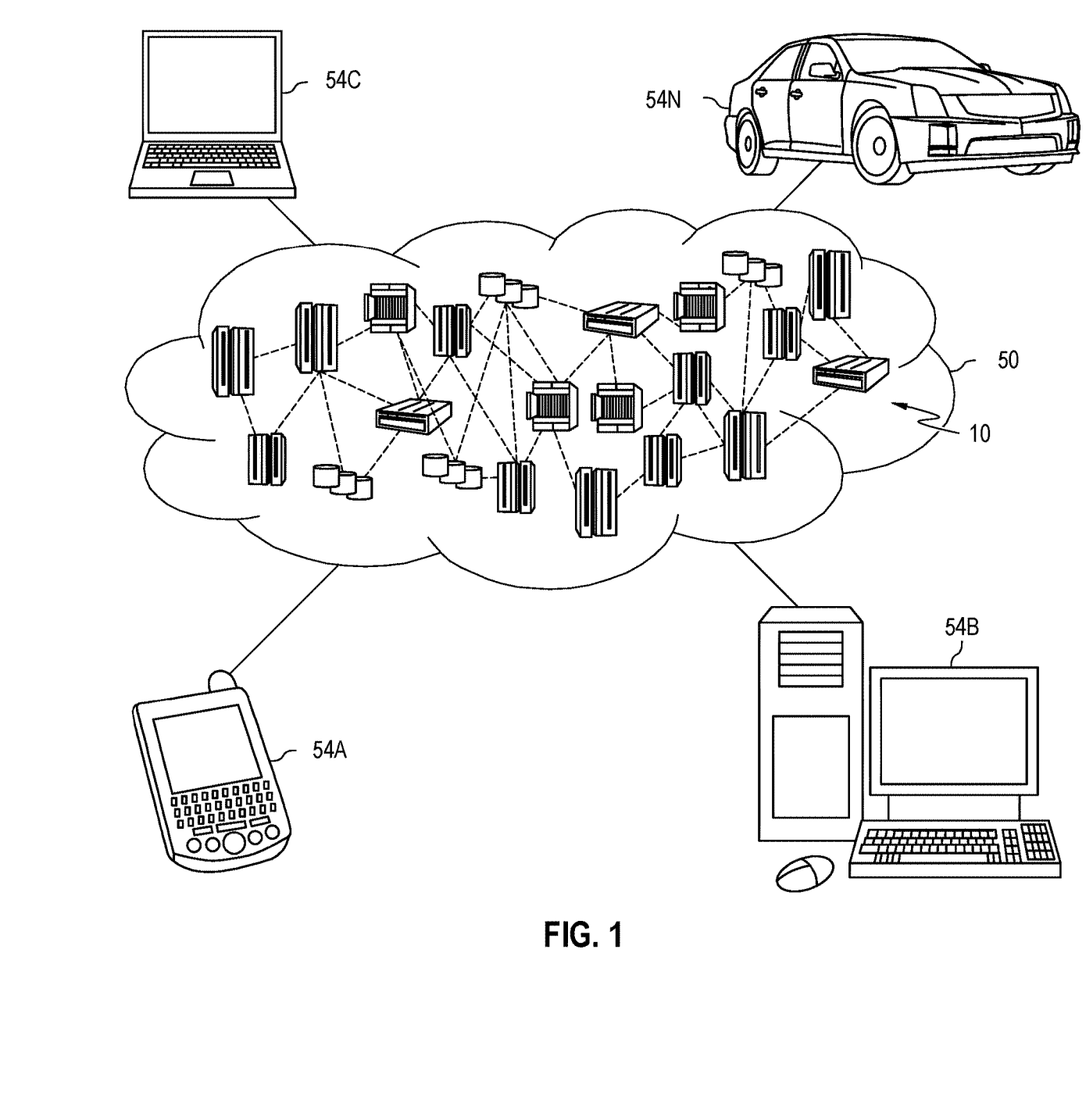
FIG. 1 depicts a cloud computing environment, consistent with some embodiments.

FIG. 1 illustrates a cloud environment, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
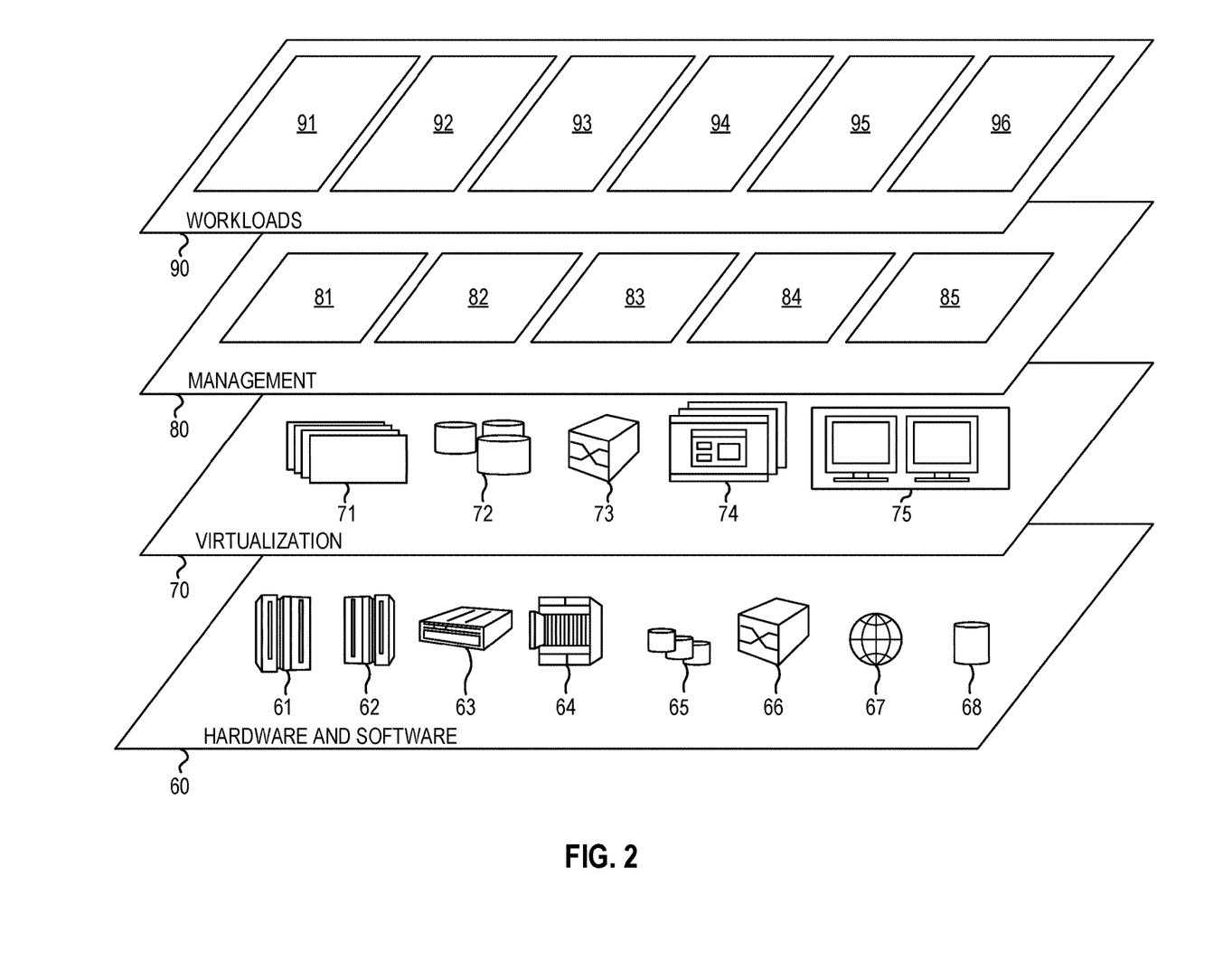
FIG. 2 depicts abstraction model layers, consistent with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a content manager 96.

Data Processing System

Figure 3:
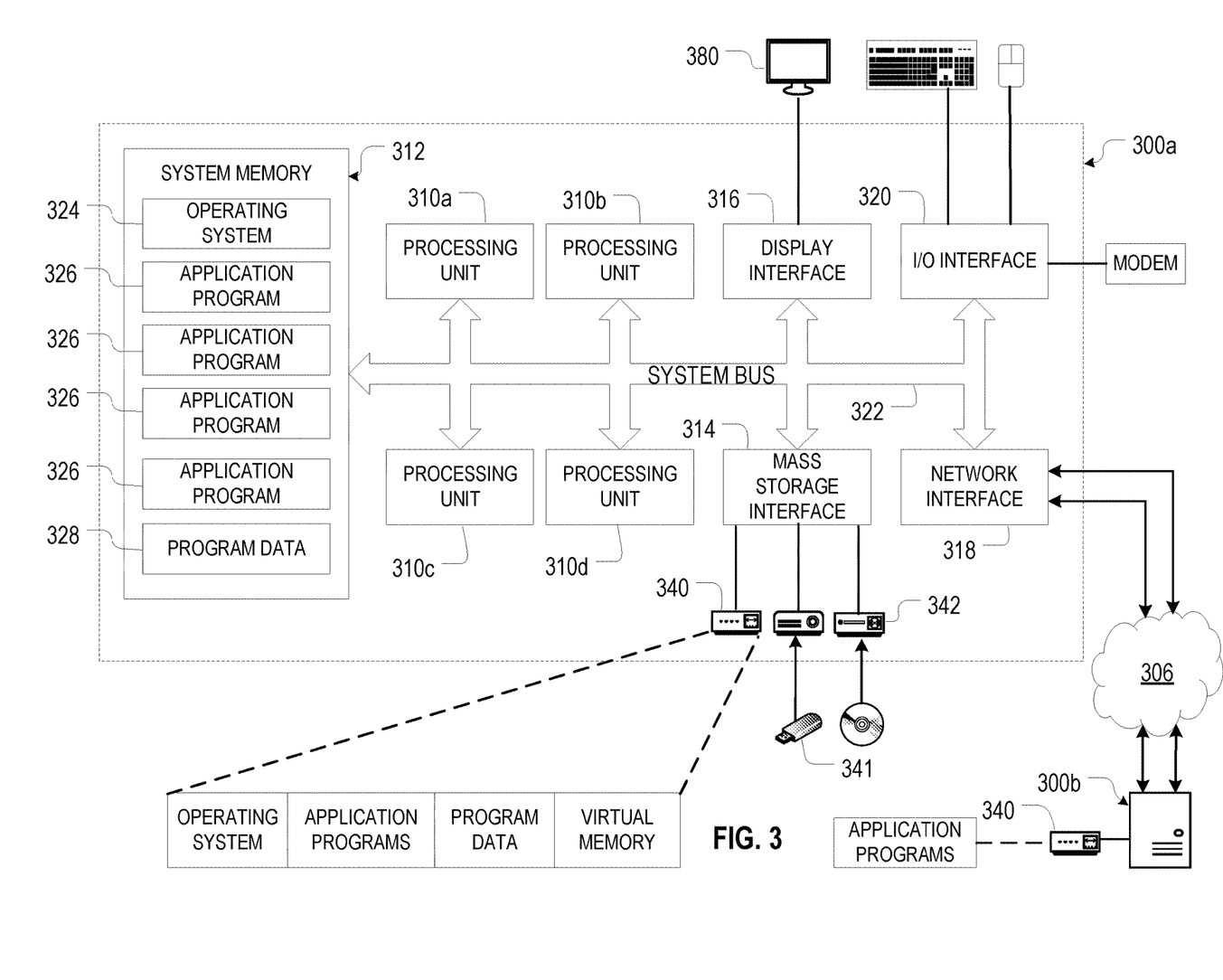
FIG. 3 depicts a data processing system, consistent with some embodiments.

FIG. 3 illustrates an embodiment of a data processing system (DPS) 300 suitable for use as a cloud computing node 10 in a cloud computing environment 50, consistent with some embodiments. In some embodiments, the DPS 300 may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 may include a plurality of central processing units 310a-310d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340, universal serial bus ("USB") storage device 341, or a readable/writable optical disk drive 342. The network interfaces 318 may allow the DPS 300a to communicate with other DPS 300b over the communications medium 306. The memory 312 may also contain an operating system 324, a plurality of application programs 326, and program data 328.

The DPS 300 embodiment in FIG. 3 may be a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the DPS 300 may comprise a single processor system and/or a single processor designed to emulate a multiprocessor system. Further, the processors 310 may be implemented using a number of heterogeneous DPS 300 in which a main processor is present with secondary processors on a single chip. As another illustrative example, the processor 310 may be a symmetric multi-processor system containing multiple processors of the same type.

When the DPS 300 starts up, the associated processor(s) 310 may initially execute the program instructions that make up the operating system 324, which manages the physical and logical resources of the DPS 300. These resources may include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 341, 342, which are in communication with the processors 310 through the system bus 322. The program code in the different embodiments may be embodied on different physical or tangible computer readable media, such as the system memory 312 or the mass storage devices 340, 341, 342. In the illustrative example in FIG. 3, the instructions may be stored in a functional form of persistent storage on the direct access storage device 340. These instructions may then be loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 341, 342 may work cooperatively to store the operating system 324, the application programs 326, and the program data 328. In the illustrated embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 341, 342.

Although the operating system 324, the application programs 326, and the program data 328 are illustrated as being contained within the memory 312, some or all of them may be physically located on different computer systems and may be accessed remotely, e.g., via the communication medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 may support the attachment of one or more mass storage devices 340, 341, 342, which are typically rotating magnetic disk drive storage devices, a solid-state storage device (SSD) that uses integrated circuit assemblies as memory to store data persistently, typically using flash memory, or a combination of the two. However, the mass storage devices 340, 341, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 may be used to directly connect one or more display units, such as monitor 380, to the DPS 300. These display units 380 may be non-intelligent (i.e., dumb) terminals, such as an LED monitor, or may themselves be fully programmable workstations used to allow IT administrators and customers to communicate with the DPS 300. Note, however, that while the display interface 316 is provided to support communication with one or more display units 380, the DPS 300 does not necessarily require a display unit 380 because all needed interaction with customers and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

System Architecture

FIG. 4 depicts a system 400 architecture, consistent with some embodiments. The system 400 embodiment in FIG. 4 may comprise an owner/creator 410 of an original video 401, a person 420 captured in the original video 401, and a plurality of viewers 430a-430d (collectively viewers 430) of the original video 401. The owner 410 and each of the viewers 430 may have a DPS 411, 431a-431d (e.g., laptop, smart-phone, tablet, etc., each of which may be, in some embodiments, a DPS 300 described above) with a network interface capable of accessing one or more common computer networks (e.g., the Internet, a proprietary social network platform, etc.) The system 400 in some embodiments may also include cloud computing infrastructure 450 (such as the cloud computing environment 50 described above) hosting a content manager 496, which may comprise a content delivery service 455 and a video creation service 460.

In operation, the owner 410 in this embodiment may use their DPS 411 to upload an original version of the video 401 to the content delivery service 455. The content delivery service 455, in turn, may store the original version of the video 401 on their computing resources 450, and may stream the original version of the video 401 to the DPS(s) 431 associated with the viewers 430 upon request. In some embodiments, a group of the viewers 430 may receive the stream substantially simultaneously (e.g., a live stream). In other embodiments, each of the viewers 430 may receive the stream at different times (e.g., an on-demand stream, a podcast, etc.)

The viewers 430 in this embodiment may consume the original video 401 from the content delivery service 455. Some of the viewers 430 may respond by posting comments and/or reactions back to the content delivery service 455, which in turn, may make those comments and/or reactions available to other viewers 430. Additionally, the content delivery service 455 may collect and use statistics about the viewers' 430 activities, such as how long they watched the video 401, at which segment they started watching, at which segment they stopped watching, which segment(s) of the video 401 the viewer watched repeatedly (i.e., looped), whether the viewer 430 paused the video 401 at any segment (s), whether they searched for explanatory material from an external source, etc. The video creation service 460 in some embodiments may automatically analyze the collected statics, the posted comments, and/or the posted reactions using Natural Language Processing (NLP) techniques to generate insights about problems with the original video 401 and/or areas for potential supplementation/improvement. The video creation service 460 may then calculate one or more preferred changes to the video 401 from a menu of potential operations, and then automatically create one or more modified videos 401a-401d containing those changes. Some embodiments may further utilize conditions specified by the owner 410, such as restrictions on the amount computing power used, the total time of the new produced video, the percentage time increase of the new video, type of content added (e.g., only language suitable for children, only non-copyrighted content), etc., when calculating the preferred changes.

The video creation service 460 in some embodiments may further comprise a relevant video segment analysis engine 462 to match the calculated insight(s) to the corresponding segment(s) of the video 401; a content modifier 464 to generate new content (e.g., modifying existing content, creating new content, creating new simulated content, and/or importing existing content from an external data sources 465) and insert that content into the video 401; a content selection module 466 that determines which modifications to make and/or include subject to the constraints; and a feedback engine 468 that may use NLP to analyze the viewer statistics, viewer comments, and viewer reaction to the video 401.

Content Enhancement

Figure 5A:
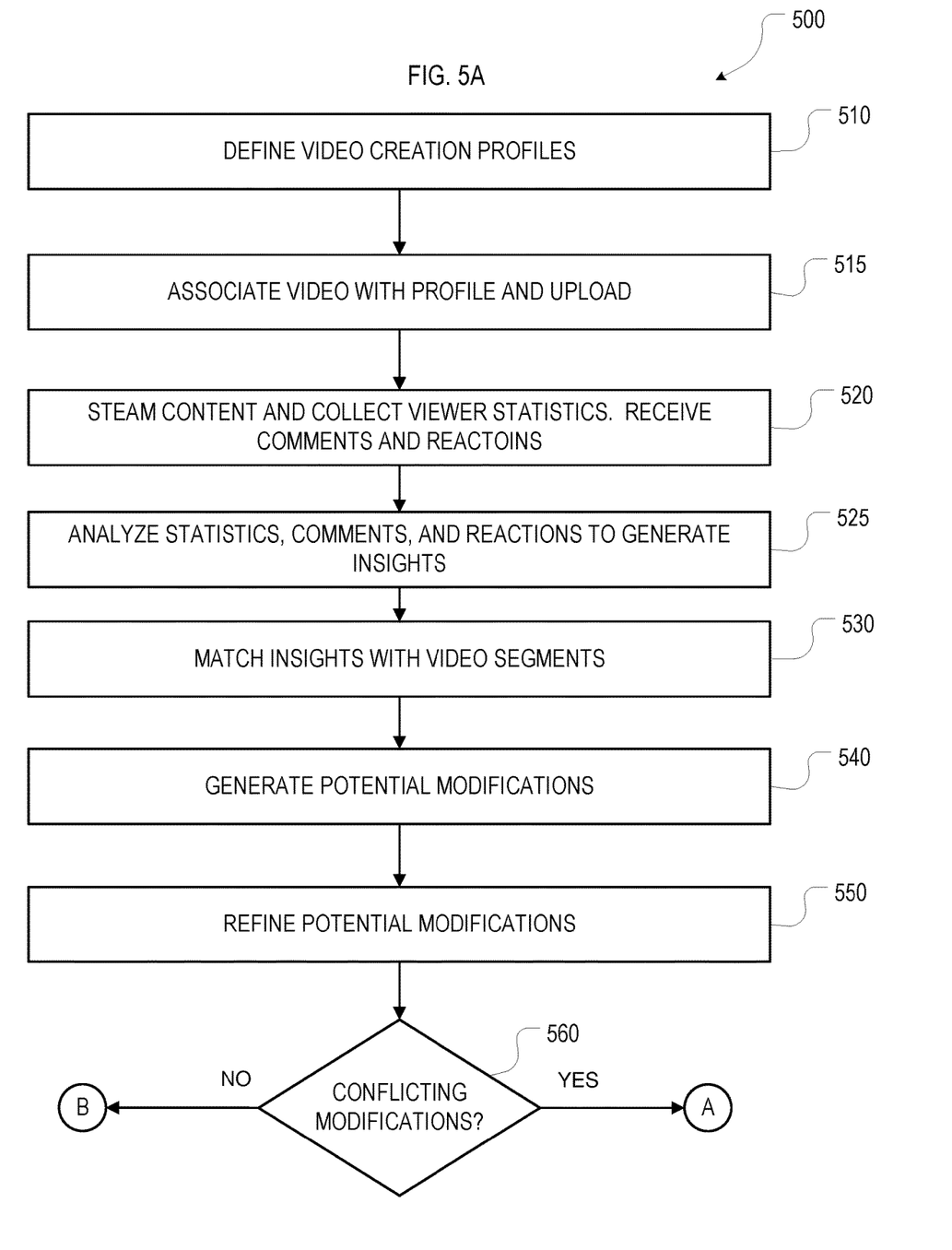
FIGS. 5A-5B illustrate one method of enhancing content, consistent with some embodiments.
Figure 5B:
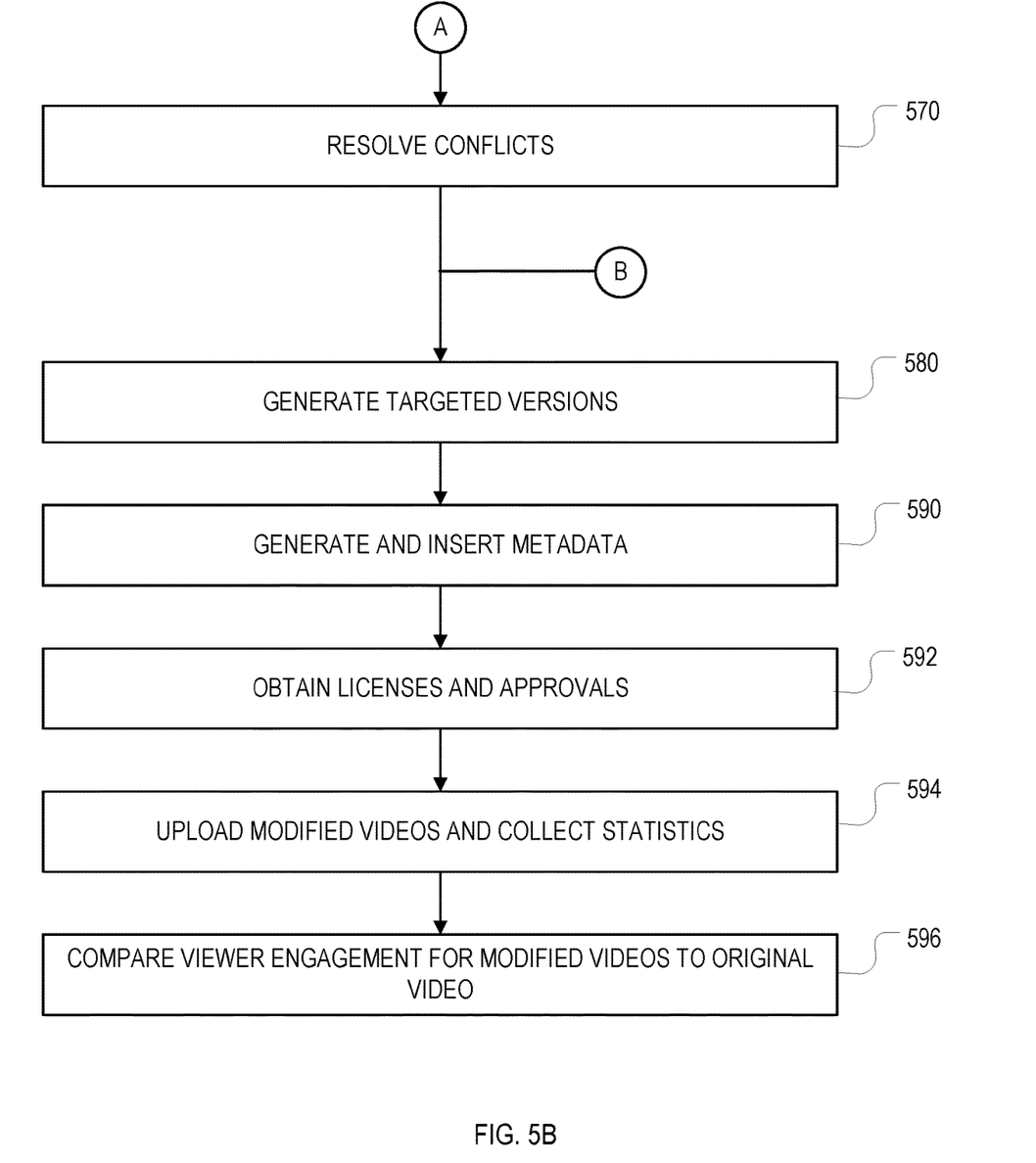

FIGS. 5A-5B (collectively FIG. 5) illustrates one method of enhancing content 500, consistent with some embodiments. At operation 510, the owner 410 of a video 401 may define one or more video creation profiles. Each profile may contain one or more preferences, such as a limit on the maximum number of modified videos that can be created, a desirability weighting of one or more user profiles for which modified videos may be created, limits on how often modified videos may be created, limits on how long a modified version should be shown, what types of third-party content may be used, what types of fix operations are allowed. Each profile may also contain one or more restrictions, such as limits on the amount computing power that may be used, the total run time of any modified videos 401a-401d, the percentage run time increases of each modified video 401a-401d compared to the original video 401, the type of and license for any new content (e.g. and without limitation, only language suitable for children or only non-copyrighted content), etc. At operation 515, the owner 410 may upload the original video 401 and associate it with one of the modification profiles and/or select one or more restrictions.

Next, the content delivery service 455 may begin to stream the uploaded original video 401 to the viewers 430, and then may begin collecting statistics about the viewing behavior and demographic profiles at operation 520. Also, at operation 520, the content delivery service 455 may receive, and then host, comments and reactions from the viewers 430. At operation 525, the video creation service 460 may begin analyzing the statistics collected by the content delivery service 455, as well as the content of the submitted comments and reactions. For example, and without limitation, if the statistics indicate that a viewer looped a portion of the video 401 between time points 2:23 and 3:12 three times, then the video creation service 460 may flag that segment as having an issue. Similarly, example comments that may indicate that segments of the original video 401 require modification may include statements such as "demonstration of the panel is too fast to see in the details," the video does not mention the amount of legroom in the car," and "how could this work for the newest version of GNU/Linux operating system?"

In some embodiments, the feedback engine 468 of the video creation service 460 may generate insights by clustering of comments processed via Natural Language Processing (NLP) based on their meaning. NLP can be also used to extract keywords such as, and without limitation, "speed up," "accelerate," "make it faster," and cluster them into an operation that indicates acceleration of segments of the original video. Another example is to cluster sentences containing keywords such as "missing information," "not clear," and "cannot understand" to indicate a segment of the video that some aspect of it needs clarification, which will be converted into an operation that will for instance add an explanation in more details of that segment of the original video.

In some embodiments, the feedback engine 468 of the video creation service 460 may also generate insights by applying sentiment analysis to the comments and reactions. For example, if a number of comments and/or reactions use sharply negative language, then the system may also more heavily weight the associated segment(s) for modification. Examples of a negative comment that will have more weight to decide on modifying such segment are "there is no way to see the legroom of the car," "you made a terrible use of the camera when presenting the legroom," and "it is really stressful to see the legroom in the video." Sentiment analysis may also utilize timestamps associated with the comments to generate a direction and trend to the sentiment (e.g., the comments are generally favorable before some event and generally unfavorable after that event).

At operation 530, the video segment analysis engine 462 of the video creation service 460 may select one or more video segments for modification responsive to the insights. In some embodiments, video segments that may benefit from modification may be identified by, for example, matching the insights obtained from operation 525 with the content of an automatically-generated transcript of the video 401. Some embodiments may also perform object identification analysis on the video 401 and then compare the resulting object list to the insights. Some embodiments may also utilize time-stamps associated with the statistics, and/or time-stamps submitted in the comments and/or reactions, to identify segments for modification.

At operation 540, the content modifier 464 of the video creation service 460 may determine how to modify the identified segments of the original video 401. This operation may include comparing the insights from operation 525 to a menu of potential operations, including stretching a segment to make it play slower, shrinking a segment to make it play faster, adding new frames with new content, adding an overlay with new content, adding text balloons with new content, and adding content from external sources 465, such as other websites, clip art, digital models, blogs, etc. This operation may also include generating a plurality of potential modifications and then selecting from among the potential modifications using the preferences and restrictions received at operation 510.

For each operation involving new content, the content modifier 464 of the video creation service 460 may initially create a revised script responsive to the comments (i.e., modify the generated transcript) and then create a simulation of the performer's/narrator's 420 voice and likeness using GAN techniques. Some embodiments may also supplement the audio visual material with supplemental textual material, such as live captioning and/or text overlays.

In some embodiments, using GAN to add additional material may include: synthesizing new frames from existing footage of the performer/narrator and a newly-created script with new statements, and synthesizing audio that resembles the video performer's/narrator's voice and/or likeness. When creating new visual effects, such as creating and adding new stylized textual material, GANs can be used to learn the styling of visual effects used in the original video and then stylize new overlays so that they match those of the original.

Next, at operation 550, the content selection module 466 of the video creation service 460 may refine parts of the video modification in view of the constraints or optimization specified at operation 510. For example, some embodiments may operate to prioritize modifications of a video that will add information relevant to a trending topic, that are responsive to concerns in a maximum number of comments, or that are responsive to the concerns of the most respected and influential viewers 430. However, adding content to address all three cases may make the resulting modified videos 401*a*-401*d* too long. In this case, in one embodiment, the video creation service 460 can present to the video owner 410 all, or a subset of, possible combinations of new versions of the original video so the video owner can make the selection of the updated version to be transferred to the content delivery service 455, or the video owner can specify a set of priorities on modification operations. In this case, a ranked list of possible updated version is generated based on this priority and the first version that meets video owner constraints can be selected.

In some cases, some insights may lead to conflicting modifications e.g., some viewers 430 may want more detail whereas other want less. In these cases, the content selection module 466 of the video creation service 460 may select at operation 570 which modification(s) should be actually inserted based on the priorities specified at operation 510. In some embodiments, the content selection module 466 of the video creation service 460 may respond by creating a plurality of different modified versions of the video 401*a*-401*d*, one targeted at each group of viewers 430 at operation 570, and then upload all of the versions to the content delivery service 455. In some embodiments, the video creation service 460 may additionally or alternatively decide to automatically generate and publish its own comments and reactions to the original video 401 to the content delivery service's 455 comment and/or message board that address the concerns of some treads (e.g., in the event of a conflict, the comments may be responsive to the lower priority modifications and/or modifications for which a textual response is calculated as being more appropriate than others, such as a response to a comment requesting a URL) at operation 570.

At operation 580, the content modifier 464 of the video creation service 460 may process the selected modification (s) to create one or more additional modified versions of the video 401*a*-401*d*. Also, at operation 590, the video creation service 460 may generate and insert metadata into the modified video(s) 401*a*-401*d* that identify what portion(s) of the modified video 401*a*-401*d* are new, what changes were made, when the changes were made, etc.

The video creation service 460 may optionally seek any necessary licenses and/or the approval of the original owner 410 of the video 401 for the modifications at operation 592. At operation 594, the video creation service 460 may automatically upload the modified version(s) of the video 401*a*-401*d* and begin collecting statistics, comments, and reactions to the modified version(s) 401*a*-401*d*. At operation 596, the video creation service 460 may compare the collected statistics (e.g., number of views, duration of views, etc.), as well as the collected comments and reactions, of the modified version(s) 401*a*-401*d* with the statistics, comments, and reactions for the original version of the video 401. If the statistics, comments, and sentiment do not improve the video, the video creation service 460 may roll back the changes, notify the original owner, etc. Alternatively, some embodiments may perform A/B testing on different versions of the video 401, 401*a*-401*d* and then select the version with the better statistics, comments, and reactions.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the customer's computer, partly on the customer's computer, as a stand-alone software package, partly on the customer's computer and partly on a remote computer or entirely on the remote computer or server. In the latter scenario, the remote computer may be connected to the customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

General

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program," "application," "server," or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A method for automatically generating enhancements to audio-visual (AV) content, comprising:
    receiving, by a network interface, data about previous consumer interactions with original AV content;
    by a processing unit:
        analyzing the data about the previous consumer interactions to generate consumer insights about the original AV content;
        automatically associating the consumer insights with a segment of the original AV content;
        automatically generating content for the segment responsive to the consumer insights; and
        injecting the generated content into the original AV content to create modified AV content; and
    automatically transmitting, by the network interface, the modified AV content.

2. The method of claim 1, further comprising collecting the data about the previous consumer interactions with the original AV content.

3. The method of claim 1, wherein the data comprises comments about the original AV content created in response to viewing the original AV content; and further comprising analyzing the comments to generate the consumer insights.

4. The method of claim 3, wherein the analyzing comprises:
    performing natural language processing on the comments to determine meaning; and
    clustering the comments using the determined meaning.

5. The method of claim 3, wherein the analyzing comprises performing sentiment analysis of the comments to determine a sentiment and sentiment direction.

6. The method of claim 1, wherein the automatically generating of the content comprises:
    generating a transcript of the original AV content;
    comparing the consumer insights to the transcript.

7. The method of claim 6, wherein the automatically generating of the content further comprises:
    modifying the transcript responsive to the consumer insights; and
    generating a simulated performance using the modified transcript.

8. The method of claim 7, wherein the automatically generating of the content further comprises using a generative adversarial network to generate the simulated performance, wherein the simulated performance resembles a performer's voice and likeness.

9. The method of claim 6, further comprising:
generating supplemental textual material using the consumer insights; and
overlaying supplemental material over the content segment.

10. The method of claim 6, further comprising:
analyzing the data about consumer interactions to generate a plurality of consumer insights about the original AV content;
detecting a conflict between at least two of the plurality of consumer insights;
selecting a priority insight from among the conflicting at least two insights, wherein the automatically generated content is responsive to the priority insight;
automatically generating comments responsive to a lower priority insight; and
publishing the generated comment as responses to comments about the original AV content.

11. The method of claim 6, further comprising:
selecting external content responsive to the consumer insights; and
adding the external content to the original AV content.

12. The method of claim 1, further comprising:
generating metadata about the modified AV content; and
appending the metadata to the modified AV content.

13. The method of claim 1, wherein the consumer interactions comprise:
comments about the content; and
data about consumers' use of the content.

14. The method of claim 1, further comprising:
receiving data about the consumer interactions with the modified AV content;
comparing the data about the consumer interactions with the modified AV content to the data about the consumer interactions with the original AV content; and
removing the modified AV content or the original AV content based on the comparison.

15. The method of claim 1, further comprising:
receiving a profile from an owner of the original AV content, the profile specifying at least one preference and at least one restriction; and
by the processing unit, automatically generating content for the segment responsive to the at least one preference and the at least one restriction.

16. The method of claim 15, further comprising:
automatically generating a plurality of potential content for the segment responsive to the consumer insights;
estimating an additional amount of time associated with the plurality of potential content; and
selecting from among the plurality of potential content using the at least one preference and the at least one restriction.

17. The method of claim 1, wherein the data about consumer interactions with the original AV content comprises trending search terms related to the original AV content.

18. The method of claim 1, further comprising, by the processing unit, automatically modifying the segment responsive to the consumer insights.

19. A content manager, comprising:
a content creation server communicatively coupled to a plurality of content consumer devices, wherein the server comprises a processor coupled to a memory, wherein the processor and the memory are configured to:
receive data about previous consumer interactions with original audio-visual (AV) content;
analyze the data about the previous consumer interactions to generate consumer insights about the original AV content;
automatically associate the consumer insights with a segment of the original AV content;
automatically generating content for the segment responsive to the consumer insights;
inject the generated content into the original AV content to create modified AV content; and
automatically transmit the modified AV content.

20. A computer program product for automatically generating enhancements to audio-visual (AV) content, the computer program product comprising a computer readable storage medium having program instructions embodied therewith, the program instructions executable by a processor to cause the processor to:
receive data about previous consumer interactions with original AV content;
analyze the data about the previous consumer interactions to generate consumer insights about the original AV content;
automatically associate the consumer insights with a segment of the original AV content;
automatically generating content for the segment responsive to the consumer insights;
inject the generated content into the original AV content to create modified AV content; and
automatically transmit the modified AV content.

21. A method for automatically generating enhancements to audio-visual (AV) content, comprising:
receiving, by a network interface, data about consumer interactions with original AV content;
by a processing unit:
analyzing the data about consumer interactions to generate consumer insights about the original AV content;
automatically associating the consumer insights with a segment of the original AV content;
automatically generating content for the segment responsive to the consumer insights; and
injecting the generated content into the original AV content to create modified AV content;
automatically transmitting, by the network interface, the modified AV content;
receiving data about the consumer interactions with the modified AV content;
comparing the data about the consumer interactions with the modified AV content to the data about the consumer interactions with the original AV content; and
removing the modified AV content or the original AV content based on the comparison.

22. The method of claim 21, further comprising collecting the data about the consumer interactions with the original AV content by a plurality of consumers of the original AV content.

23. The method of claim 22, wherein the data comprises comments about the original AV content created in response to viewing the original AV content by a plurality of consumers of the original AV content; and further comprising analyzing the comments to generate the consumer insights.

24. A method for automatically generating enhancements to audio-visual (AV) content, comprising: receiving, by a network interface, data about consumer interactions with original AV content; receiving a profile from an owner of the original AV content, the profile specifying at least one preference and at least one restriction; and by a processing unit: analyzing the data about consumer interactions to generate consumer insights about the original AV content; automatically associating the consumer insights with a segment of the original AV content; automatically generating content for the segment responsive to the consumer insights, the at least one preference, and the at least one restriction; and injecting the generated content into the original AV content to create modified AV content; and automatically transmitting, by the network interface, the modified AV content.

25. The method of claim 24, further comprising: automatically generating a plurality of potential content for the segment responsive to the consumer insights; estimating an additional amount of time associated with the plurality of potential content; and selecting from among the plurality of potential content using the at least one preference and the at least one restriction.

* * * * *